(12) United States Patent
Fishman

(10) Patent No.: US 7,087,870 B1
(45) Date of Patent: Aug. 8, 2006

(54) INDUCTION HEATING OR MELTING WITH MULTIPLE FREQUENCIES

(75) Inventor: Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 11/153,828

(22) Filed: Jun. 15, 2005

(51) Int. Cl.
*H05B 6/08* (2006.01)
*H02M 3/335* (2006.01)

(52) U.S. Cl. .................. 219/661; 219/666; 373/148; 363/58

(58) Field of Classification Search ........ 219/660–669; 373/138–139, 144–152; 75/10.14; 363/58, 363/136
See application file for complete search history.

(56) References Cited

U.S. PATENT DOCUMENTS

| 3,448,367 A | * | 6/1969 | Corey ......................... 363/58 |
| 4,114,010 A | * | 9/1978 | Lewis ......................... 219/666 |
| 6,542,535 B1 | * | 4/2003 | Fishman et al. ............ 373/150 |

* cited by examiner

*Primary Examiner*—Philip H. Leung
(74) *Attorney, Agent, or Firm*—Philip O. Post

(57) ABSTRACT

An apparatus and process are provided for multi-frequency induction heating of a workpiece. Switching devices are used to selectively add, remove or reconfigure capacitive elements in the circuit to change the circuit's resonant frequency, and consequently, the frequency of induction heating or melting power transfer from the power supply to the load.

10 Claims, 3 Drawing Sheets

INDUCTION HEATING OR MELTING WITH MULTIPLE FREQUENCIES

CROSS REFERENCE TO RELATED APPLICATIONS

Not applicable.

FIELD OF THE INVENTION

The present invention relates to induction heating or melting wherein multiple frequencies are used to heat or melt a workpiece by electric induction.

BACKGROUND OF THE INVENTION

Multi-frequency induction heating and melting is known in the art. See for example U.S. Pat. No. 2,444,259, which is titled Method of High Frequency Induction Heating. Different frequencies result in different depths of induced eddy current heating in the workpiece, susceptor, or electrically conductive load placed in a crucible; the higher the frequency, the lower the effective induced eddy current depth of the current in the workpiece, susceptor or electrically conductive load. Multi-frequency currents may be applied (1) simultaneously or sequentially and (2) to a single or multiple induction coils that are disposed around the workpiece, susceptor or crucible in which the electrically conductive material is placed.

For an electrically conductive material, such as a metal composition that is placed in a crucible, the combination of low and high induction frequencies may be desirable to melt the metal at a high frequency and to stir the metal at a low frequency.

For the geometry of some workpieces, the combination of low and high induction heating frequencies is desirable. For example to metallurgically harden gear teeth it is known that a relatively low frequency (e.g., 3 kilohertz to 10 kilohertz) with relatively deep penetration of the induced eddy current into the gear is preferred to preheat the gear while a relatively high frequency (e.g., 30 kilohertz through 100 kilohertz) with relatively shallow penetration of the induced eddy current into the gear is preferred for final induction heating.

One objective of the present invention is to provide induction power at multiple frequencies to a workpiece with efficient transfer means between the multiple frequencies.

BRIEF SUMMARY OF THE INVENTION

In one aspect, the present invention is an apparatus for, and method of, inductively heating or melting a workpiece at two or more frequencies by switching tuning capacitive elements into and out of an inverter circuit, or rearranging the tuning capacitive elements in the inverter circuit, to provide power at different frequencies to an induction load coil.

In another aspect, the present invention comprises an inverter circuit having first and second branches and a diagonal connected between the first and second branches. Commutation devices, at least one resonance capacitive element, and at least one tuning capacitive element are disposed in the inverter circuit. At least one switch is disposed in the diagonal of the inverter circuit, along with at least one induction load coil. The at least one switch is used to selectively insert or remove one or more of the at least one tuning capacitive elements in the inverter circuit, or to rearrange the at least one tuning capacitive element and the at least one resonance capacitive element in the inverter circuit, whereby the resonant frequency of the inverter circuit is changed to inductively heat or melt a workpiece at different frequencies when the workpiece is positioned adjacent to the magnetic field created by the flow of ac power through the at least one induction load coil.

Other aspects of the invention are set forth in this specification and the appended claims.

BRIEF DESCRIPTION OF THE DRAWINGS

The figures, in conjunction with the specification and claims, illustrate one or more non-limiting modes of practicing the invention. The invention is not limited to the illustrated layout and content of the drawings.

DETAILED DESCRIPTION OF THE INVENTION

Figure 1:
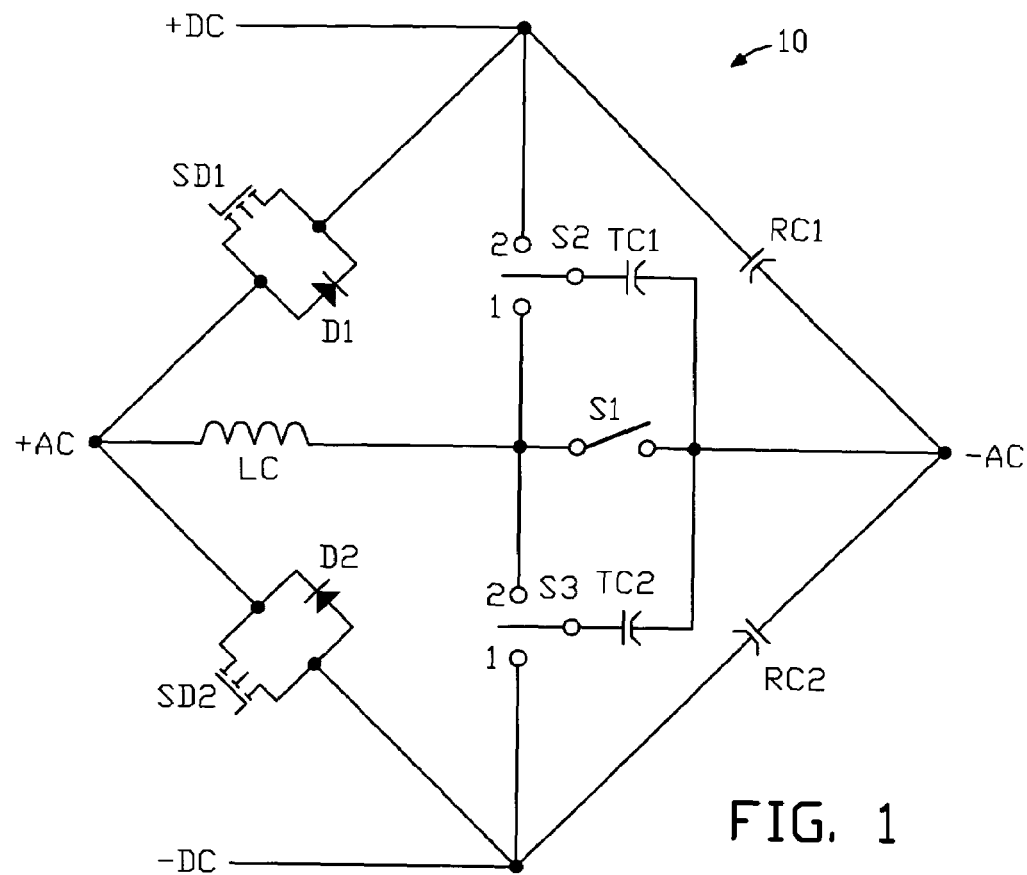
FIG. 1 is a simplified schematic illustrating one example of the multi-frequency induction heating or melting apparatus of the present invention.

FIG. 1 illustrates one example of the induction heating or melting apparatus of the present invention. In this example of the invention, resonant bridge inverter 10 comprises commutation devices, resonance capacitors, tuning capacitors and switching elements. Substantially inductive load coil LC is powered by the inverter. Commutation device SD1 with antiparallel diode D1, and commutation device SD2 with antiparallel diode D2 comprise the first branch of the inverter. The second branch of the inverter comprises resonance capacitors RC1 and RC2. Tuning capacitors TC1 and TC2, along with switches S1, S2 and S3 and the load coil, form the diagonal of the inverter, which is connected between the midpoints of the first and second branches. Inductive load coil LC, although shown with an inductor symbol, also exhibits circuit resistance.

In other examples of the invention the inductive load coil may be otherwise arranged. For example, coil LC may be replaced by a primary transformer coil that is magnetically coupled to a secondary transformer coil, which serves as the coil around which the workpiece is disposed.

In FIG. 1 an ac magnetic field is established around load coil LC by flowing ac current supplied by the inverter operating with an output frequency, F, through the coil. Switching elements, namely switches S1, S2 and S3, provide a means for reconfiguring the capacitance of the inverter by selectively inserting, removing or reconnecting the tuning capacitors in the active circuit. A workpiece or susceptor may be brought into the vicinity of the magnetic field to inductively heat the workpiece or susceptor, or the load coil may be place around a crucible in which an electrically conductive load, such as a molten metal, has been placed, to inductively heat, melt and/or stir the load.

For convenience of reference, the term "workpiece" is used to refer to a workpiece for heating, a susceptor or an electrically conductive material placed in a crucible. Further the term "surrounding the workpiece" with reference to one or more induction load coils of the present invention includes arrangements wherein the workpiece is positioned so that the magnetic field created by the flow of ac current through the one or more induction load coils penetrates the workpiece.

Ideally for maximum transfer of power from the output of the inverter to load coil LC, the output frequency of the inverter should be at or near resonance. For an LC-circuit, resonant frequency, F, is calculated from the formula:

$$F = 1/2\pi\sqrt{L \cdot C}$$

wherein L is the equivalent inductance of the circuit and C is the equivalent capacitance ($C_{eq}$) of the resonant circuit.

Referring to FIG. 1, preferably, but not limiting, tuning capacitors TC1 and TC2 will have substantially the same value of capacitance, $C_{TC}$, and resonance capacitors RC1 and RC2 will have substantially the same value of capacitance, $C_{RC}$. With this arrangement, when both tuning capacitors and both resonance capacitors are all in series (switch S1 opened, switch S2 at position 1 and switch S3 at position 2) the equivalent circuit capacitance, $C_{eq}$, at resonant frequency F, can be calculated as:

$$C_{eq} = 2 \times \frac{C_{TC} \times C_{RC}}{C_{TC} + C_{RC}}.$$

The change in $C_{eq}$, as well as the change in resonant frequency, F, as switches S1, S2 and S3 change positions, relative to the calculated $C_{eq}$ above, is illustrated in the following table:

| Positions of switches | Configuration of circuit capacitors | Equivalent circuit capacitance | Resonant frequency |
| --- | --- | --- | --- |
| S1 opened; S2 at position 1; and S3 at position 2 | Parallel combination of TC1 and TC2 in series with parallel combination of RC1 and RC2 | $C_{eq}$ | F |
| S1 closed; S2 and S3 open | RC1 in parallel with RC2 | 2 $C_{eq}$ | 0.7 F |
| S1 closed; S2 at position 2 and S3 at position 1 | Parallel combination of RC1 and RC2 in parallel with parallel combination of TC1 and TC2 | 4 $C_{eq}$ | 0.5 F |

Therefore in this non-limiting example of the invention, induction heating or melting frequencies may be switched between F, 0.7 F, and 0.5 F with the speed of switching being dependent upon the switching speed of switches S1, S2 and S3, which may be of any form, such as electromechanical or solid state, as required to suit a particular application.

Figure 2:
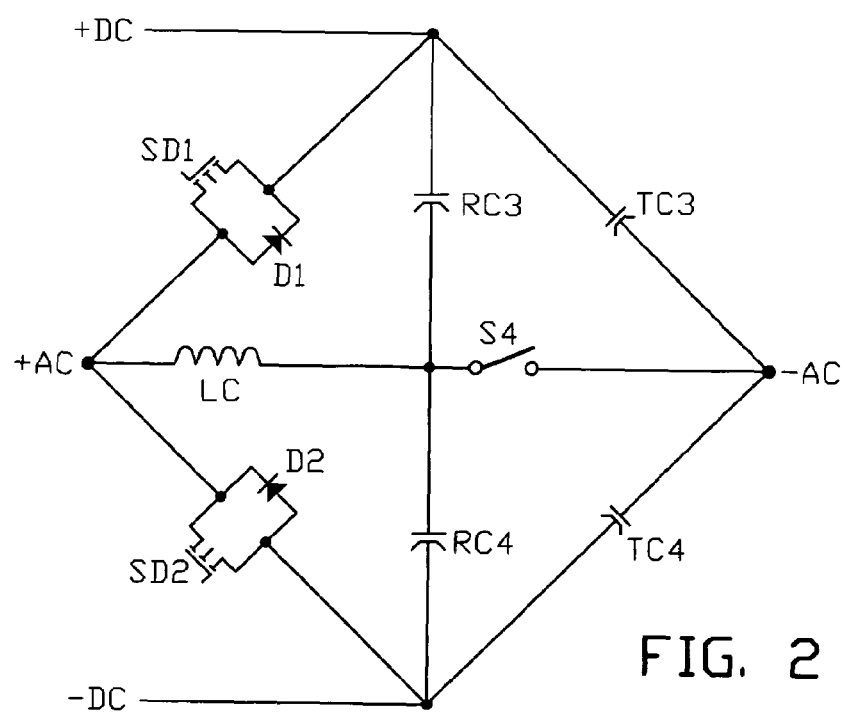
FIG. 2 is a simplified schematic illustrating another example of the multi-frequency induction heating or melting apparatus of the present invention.

FIG. 2 illustrates another example of the induction heating or melting apparatus of the present invention wherein a single switch S4 provides a means for switching the circuit configuration of tuning capacitors TC3 and TC4 and resonance capacitors RC3 and RC4. When switch S4 is in the opened position as shown in the figure, the series combination of tuning capacitors TC3 and TC4 is in parallel with the series combination of resonance capacitors RC3 and RC4, and when switch S4 is in the closed position, the parallel combination of tuning capacitor TC3 and resonance capacitor RC3 is in parallel with the parallel combination of tuning capacitor TC4 and resonance capacitor RC4, whereby the equivalent load circuit capacitance changes, along with the resonant frequency of the load circuit, when switch S4 alternates between the opened and closed positions.

Figure 3:
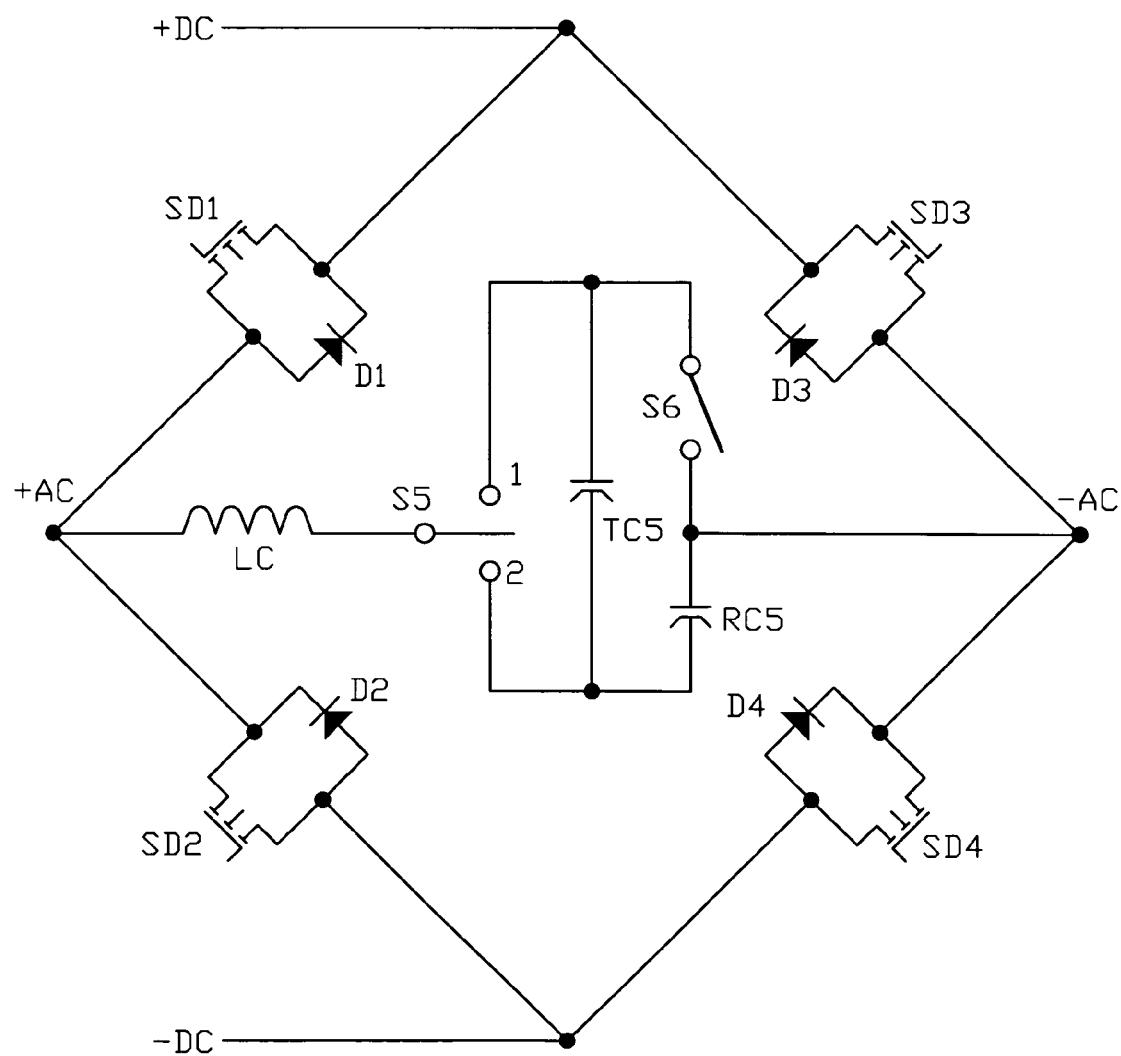
FIG. 3 is a simplified schematic illustrating another example of the multi-frequency induction heating or melting apparatus of the present invention.

FIG. 3 illustrates another example of the induction heating or melting apparatus of the present invention. In this example, commutation device SD1 with antiparallel diode D1, and commutation device SD2 with antiparallel diode D2 comprise the first branch of the inverter; commutation device SD3 with antiparallel diode D3, and commutation device SD4 with antiparallel diode D4 comprise the second branch of the inverter. Tuning capacitor TC5, resonance capacitor RC5, along with switches S5 and S6 and the load coil, form the diagonal of the inverter, which is connected between the midpoints of the first and second branches.

In one non-limiting example wherein tuning capacitor TC5 has substantially the same value of capacitance, C, as does resonance capacitor RC5, the change in capacitance C, as well as the change in resonant frequency, F, as switches S5 and S6 change positions, relative to capacitance C, is illustrated in the following table:

| Positions of switches | Configuration of circuit capacitors | Equivalent circuit capacitance | Resonant frequency |
| --- | --- | --- | --- |
| S5 at position 1 and S6 opened | TC5 in series with RC5 | 0.5 C | F |
| S5 at position 2 and S6 opened | RC5 (TC5 not in circuit) | C | 0.7 F |
| S5 at position 1 and S6 closed | TC5 in parallel with RC5 | 2 C | 0.5 F |

Figure 4A:
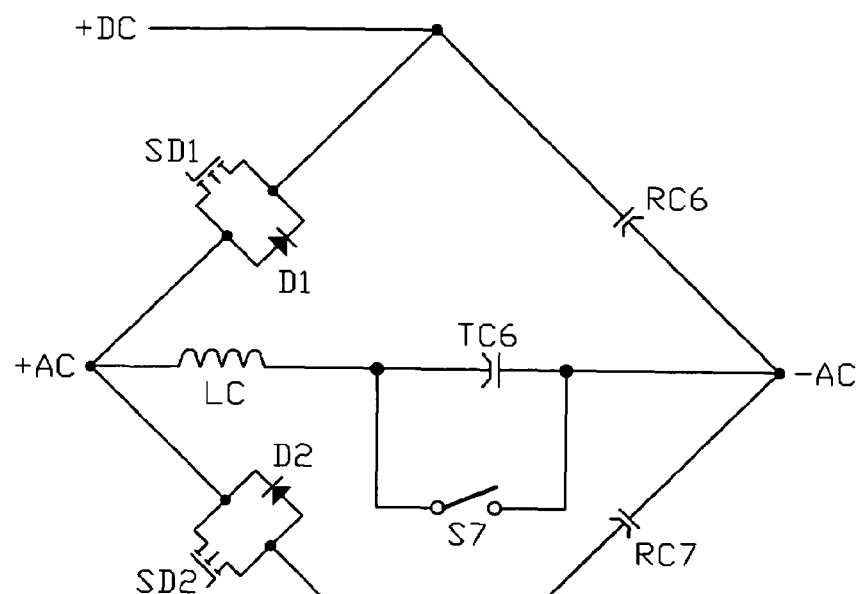
FIG. 4(a) is a simplified schematic illustrating another example of the multi-frequency induction heating or melting apparatus of the present invention.

There is shown in FIG. 4(a) another example of the induction heating melting apparatus of the present invention. In this arrangement commutation device SD1 with antiparallel diode D1, and commutation device SD2 with antiparallel diode D2 comprise the first branch of the inverter, and resonance capacitors RC6 and RC7 comprise the second branch of the inverter. Tuning capacitor TC6, along with switch S7 and the load coil, form the diagonal of the inverter, which is connected between the midpoints of the first and second branches. When ac current supplied from the inverter flows through the induction load coil a magnetic field is created. A workpiece can be positioned so that the magnetic field created by the flow of ac current through the induction load coil penetrates the workpiece to inductively heat or melt the workpiece as further described above.

In operation switch S7 can be opened, as shown in the figure, or closed, to either include the tuning capacitor in the circuit, or bypass the tuning capacitor out of the circuit, respectively. The circuit impedance of the load coil, the tuning capacitor (if present in the active circuit) and the resonance capacitors determines the resultant load impedance seen by the output of the inverter. Therefore shorting tuning capacitor TC6 by closing switch S7 will increase the circuit's equivalent capacitance and, consequently, lower the resonant frequency of the circuit. Conversely opening switch S7 will decrease the circuit's capacitance and, consequently, increase the resonant frequency of the circuit.

Figure 4B:
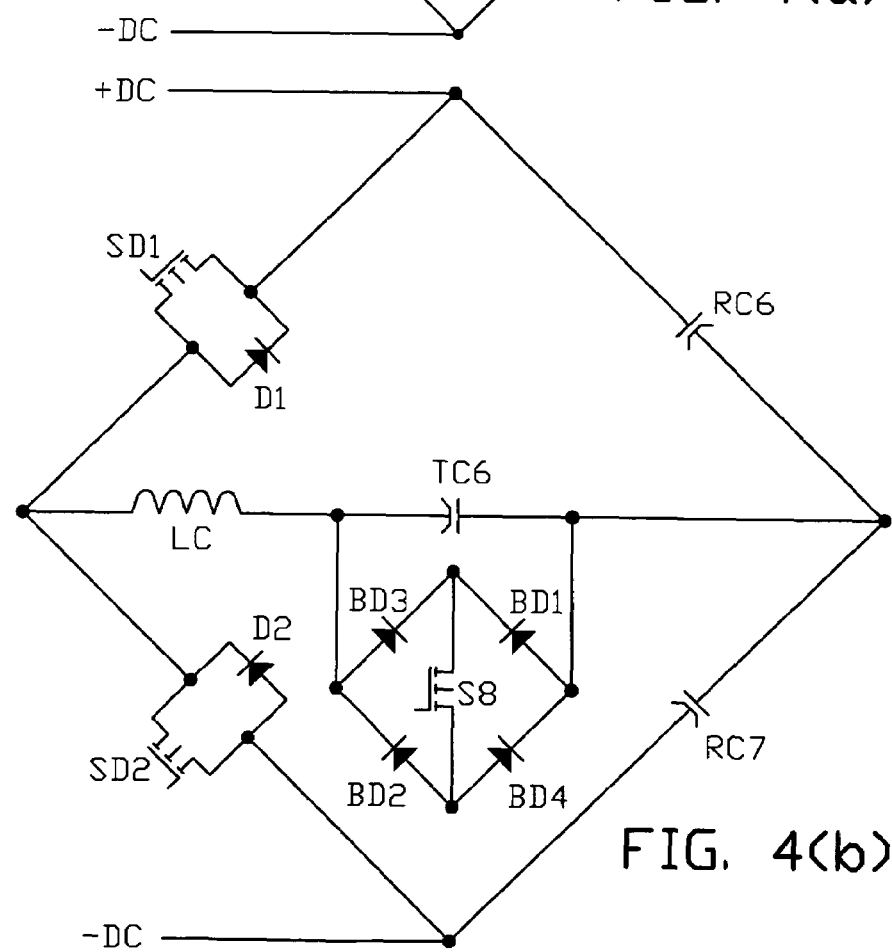
FIG. 4(b) is a simplified schematic illustrating another example of the multi-frequecny induction heating or melting apparatus shown in FIG. 4(a) wherein the switch associated with the tuning capacitor comprises a diode bridge and switching element.

FIG. 4(b) illustrates one non-limiting example of providing the switch means for switch S7 in FIG. 4(a). In FIG. 4(b)

the switching means for shorting tuning capacitor TC6 is accomplished by a diode bridge that is formed from diodes BD1, BD2, BD3 and BD4, and is connected across the tuning capacitor. Switch S8, for example, a transistor, is connected across the center of the bridge to short out the tuning capacitor when the switch is closed.

By way of non-limiting example, when the apparatus in FIG. 4(a) or FIG. 4(b) is used to achieve dual frequency induction heating of a workpiece with a low frequency of around 3 kilohertz to 10 kilohertz and a high frequency of around 30 kilohertz to 100 kilohertz, the capacitance of tuning capacitor TC6 should be selected as around 100 times smaller than the capacitance of resonance capacitors RC6 and RC7.

Although a resonant inverter is used in the above examples of the invention, other inverter arrangements or topologies may be used without deviating from the scope of the invention. In all examples of the invention the output of the inverter may operate at a fixed frequency or varied. The switching devices that are used in the above examples of the invention, including transistors or other solid state devices, such as the commutation devices illustrated with insulated gate bipolar transistor symbols, are exemplary and may be replaced by any other suitable switching device or element.

The examples of the invention include reference to specific electrical components. One skilled in the art may practice the invention by substituting components that are not necessarily of the same type but will create the desired conditions or accomplish the desired results of the invention. For example, single components may be substituted for multiple components or vice versa.

The foregoing examples do not limit the scope of the disclosed invention. The scope of the disclosed invention is further set forth in the appended claims.

The invention claimed is:

1. An apparatus for induction heating or melting of a workpiece at multiple frequencies, the apparatus comprising:
   an inverter circuit comprises comprising a first branch comprising a pair of commutation devices, a second branch comprising a pair of resonance capacitors, and a diagonal comprising a first and second tuning capacitors, and an induction load coil, the diagonal connected between the midpoints of the first and second branches; and
   a first, second and third switching elements for selectively removing or inserting at least one of the first or second tuning capacitors from the inverter circuit or rearranging the pair of resonance capacitors and the first and second tuning capacitors in the inverter circuit.

2. The apparatus of claim 1 wherein the first and second tuning capacitors each having a first terminal connected to the midpoint of the second branch of the inverter circuit, the first switching element having a first terminal connected to the midpoint of the second branch of the inverter circuit, the first switching element having a second terminal connected to the first terminal of the induction load coil, the second terminal of the induction load coil connected to the midpoint of the first branch of the inverter circuit, the second switching element having means for selectively switching a second terminal of the first tuning capacitor to the first dc terminal across the first branch of the inverter circuit, the second terminal of the first switching element or open circuit, the third switching element having means for selectively switching a second terminal of the second tuning capacitor to the second dc terminal across the first branch of the switching section of the inverter circuit, the second terminal of the first switching element or open circuit.

3. An apparatus for induction heating or melting of a workpiece at multiple frequencies, the apparatus comprising:
   an inverter circuit comprising a first branch comprising a pair of commutation devices, a second branch comprising a pair of tuning capacitors, and a diagonal comprising a pair of resonance capacitors, a first switching element for selectively removing or inserting at least one of the pair of tuning capacitors from the inverter circuit or rearranging the pair of resonance capacitors and the pair of tuning capacitors in the inverter circuit and an induction load coil, the diagonal connected between the midpoints of the first and second branches.

4. The apparatus of claim 3 wherein the first terminal of the first switching element connected to the midpoint of the second branch of the inverter circuit, the second terminal of the first switching element connected to the common connection between the first terminals of the first and second resonance capacitors, the second terminal of the first resonance capacitor connected to the first dc terminal across the first branch of the inverter circuit, the second terminal of the second resonance capacitor connected to the second dc terminal across the first branch of the inverter circuit, the first terminal of the induction coil connected to the second terminal of the first switching element, the second terminal of the induction coil connected to the midpoint of the first branch of the inverter circuit.

5. An apparatus for induction heating or melting of a workpiece at multiple frequencies, the apparatus comprising:
   an inverter circuit comprising a first branch comprising a first pair of commutation devices, a second branch comprising a second pair of commutation devices, and a diagonal comprising a first resonance capacitor, a first tuning capacitor, a first and second switching elements for selectively removing or inserting the first tuning capacitor from the inverter circuit or rearranging the first resonance capacitor and the first tuning capacitor in the inverter circuit and an induction load coil, the diagonal connected between the midpoints of the first and second branches.

6. The apparatus of claim 5 wherein the first resonance capacitor having a first terminal connected to the midpoint of the second branch of the inverter circuit, the second terminal of the first resonance capacitor connected to the first terminal of the first tuning capacitor, the first terminal of the first switching element connected to the first terminal of the first tuning capacitor, the second terminal of the first switching element connected to the second terminal of the first tuning capacitor, the second switching element connected to the first terminal of the induction coil, the second switching element having means for selectively switching the load coil between the second terminal of the first tuning capacitor or the second terminal of the first resonance capacitor, and the second terminal of the induction coil connected to the midpoint of the first branch of the inverter circuit.

7. An apparatus for induction heating or melting of a workpiece at multiple frequencies, the apparatus comprising:
   an induction load coil;
   an inverter circuit comprising:
      a first branch comprising a pair of commutation devices;

a second branch comprising a pair of resonance capacitors; and a diagonal comprising at least one tuning capacitor in series with the induction load coil and a switching element in parallel with at least one of the at least one tuning capacitor, the diagonal connected between the midpoints of the first and second branches of the inverter circuit.

8. The apparatus of claim 7 wherein the switching means comprises a diode bridge exclusively connected across at least one of the at least one tuning capacitor, and a bridge switching element connected across the center of each of the diode bridges to selectively bypass the at least one tuning capacitor exclusively connected to the diode bridge.

9. A method of induction heating or melting a workpiece, the method comprising the steps of:

forming an inverter circuit having a first and second branch and a diagonal, the inverter comprising at least two commutation devices, at least one resonance capacitor and at least one tuning capacitor;

inserting an induction load coil in the diagonal of the inverter circuit;

inserting at least one switching element in the diagonal of the inverter circuit;

supplying ac power from the inverter circuit to the induction load coil; and selectively operating each of the at least one switching devices to alter the equivalent capacitance of the at least one tuning capacitor and the at least one resonance capacitor.

10. A method of induction heating or melting a workpiece, the method comprising the steps of:

placing the workpiece at least partially within an induction coil disposed in a diagonal of an inverter circuit having at least one switching element, the diagonal of the inverter circuit located between a first and second branches, the inverter comprising at least two commutation devices, at least one resonance capacitor and at least one tuning capacitor;

supplying ac power from the inverter circuit to the induction coil; and selectively operating each of the at least one switching devices to alter the equivalent capacitance of the at least one tuning capacitor and the at least one resonance capacitor to inductively heat or melt the workpiece.

* * * * *

UNITED STATES PATENT AND TRADEMARK OFFICE
CERTIFICATE OF CORRECTION

| | | |
|---|---|---|
| PATENT NO. | : 7,087,870 B1 | Page 1 of 1 |
| APPLICATION NO. | : 11/153828 | |
| DATED | : August 8, 2006 | |
| INVENTOR(S) | : Oleg S. Fishman | |

It is certified that error appears in the above-identified patent and that said Letters Patent is hereby corrected as shown below:

Column 5, line 40, "comprises comprising" should read --comprising--.

Signed and Sealed this

Seventeenth Day of November, 2009

David J. Kappos
*Director of the United States Patent and Trademark Office*